Figure 1:
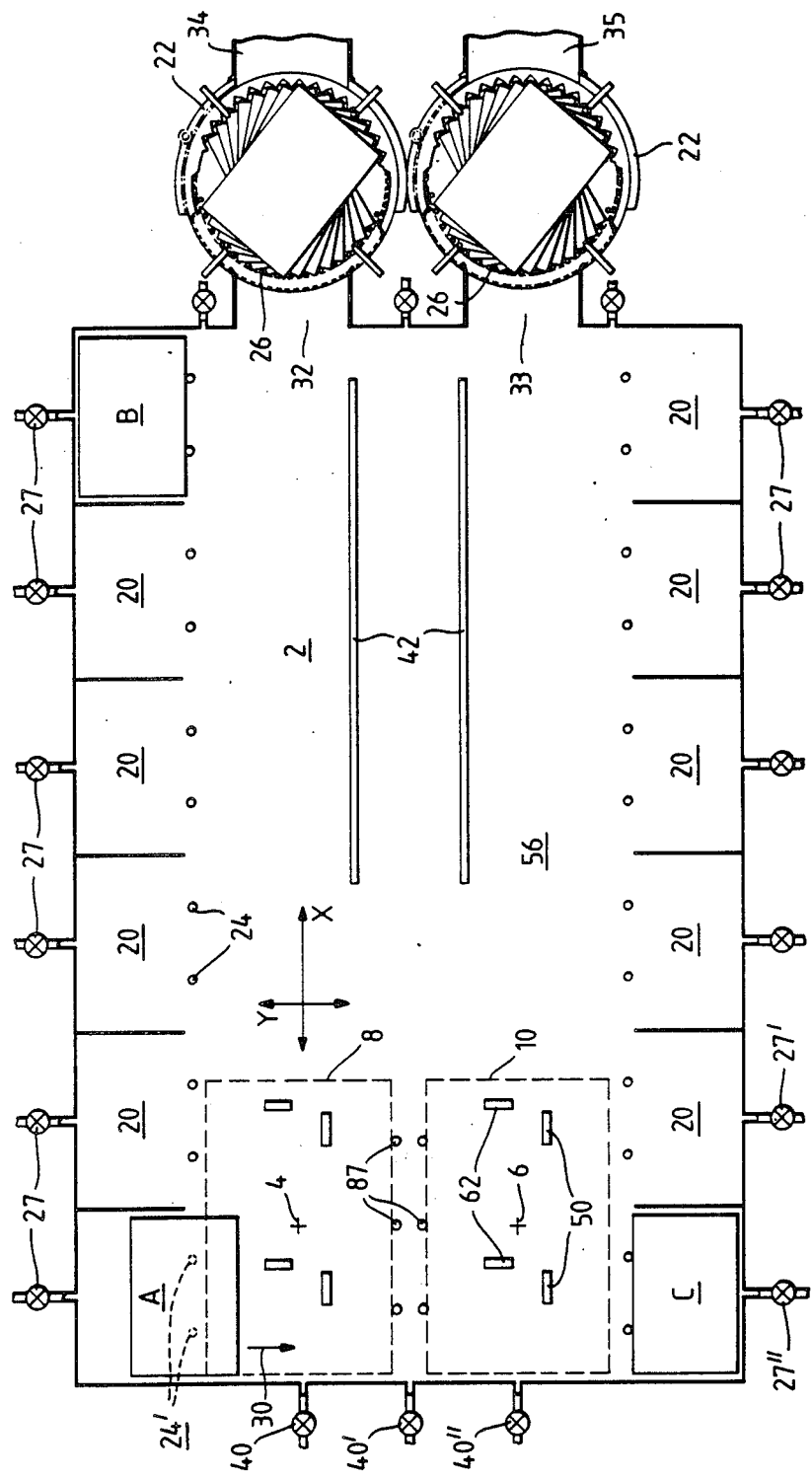

United States Patent [19]

Spence-Bate et al.

[11] Patent Number: 4,681,429
[45] Date of Patent: Jul. 21, 1987

[54] FILM LAMINA HANDLING

[75] Inventors: Harry A. H. Spence-Bate, Morley, Australia; Timothy B. Smith, Wickens Manor, England

[73] Assignee: Joyce Florence Spence-Bate, Morley, Australia

[21] Appl. No.: 850,668

[22] Filed: Apr. 11, 1986

[30] Foreign Application Priority Data

Apr. 12, 1985 [AU] Australia .............................. PH0110

[51] Int. Cl.$^4$ ............................................ G03B 27/60
[52] U.S. Cl. ......................................... 355/73; 355/53
[58] Field of Search .............................. 355/53, 73, 76

[56] References Cited

U.S. PATENT DOCUMENTS 3,103,850  9/1963  Khoury et al. ...................... 355/76
4,176,947  12/1979  Spence-Bate et al. ................ 355/53

Primary Examiner—Monroe H. Hayes
Attorney, Agent, or Firm—Franklin D. Wolffe; Morris Fidelman

[57] ABSTRACT

A film lamina handling and storage device particularly suitable for handling microfiche has a central transfer area formed between upper and lower plates in which a cushion of gas is maintained to support film laminae on the cushion: the laminae may be moved around the area by gas flowing to outlets venting outwardly of the periphery of the plates; stores for individual or stacks of laminae are conveniently situated around the transfer area, the individual laminae stores being at the same level as the transfer area: the transfer area may have copying or other treatment positions.

9 Claims, 4 Drawing Figures

FILM LAMINA HANDLING

The present invention relates to a film lamina storage and handling device.

In my U.S. Pat. No. 4,176,947 there is shown and described apparatus for moving a microfiche in a microfiche camera. That apparatus employs a gas cushion to float the microfiche lamina so that it can easily be moved. In order to direct the lamina to a required position between two opposed plates movable ducts are used (see FIG. 8 activators 94 and jets 95) as well as using fixed jet manifolds 54, 55 and 57. These inlets are controlled as required. Whilst these work well, it has now been discovered that improvements in directing a lamina may be now achieved.

According to one aspect of the invention a film lamina storage and handling device is provided having at least one treatment position where the film is treated, the device comprising an upper and lower plate defining a transfer area at least partially enclosing the treatment position, means for maintaining a cushion of gas between the plates and a periphery of the plates to support a lamina in a plurality of X and Y positions relative to the treatment position and means for moving the lamina relative to the treatment position comprising a gas inlet above or below the plates and a plurality of controllable outlets venting outwardly of the periphery.

By controlling the outlets rather than the inlets it has been found that the lamina is quicker to respond to the controlling gas streams. Furthermore the direction is more accurate.

According to another aspect of the invention a film lamina storage and handling device is provided having at least one treatment position where the film is treated, the device comprising an upper and a lower plate defining a transfer area at least partially enclosing the treatment position, means for maintaining a cushion of gas between the plates and a periphery of the plates to support a lamina in a plurality of X and Y positions relative to the treatment position, a plurality of lamina stores on the perifery of the transfer area, each store being substantially at the same level as the medium level between the plates.

The advantage of providing several stores around the transfer area at the same level as each other and level with the area of movement of the laminae around the treatment area is that frequently used laminae (e.g. microfiches) can be quickly moved to and from the treatment area without being subjected to a complex retrieval process from a large magazine. In this way a single index lamina can be kept in one store whilst several laminae in a stack can be kept in a different store.

Since the handling device of the invention is designed to move the laminae around the treatment area by means of air flows it may be necessary to interpose an additional transport system which does not depend on airflows. In this way one lamina may be transported from its store to a treatment station (e.g. copying station) by the airflow whilst another lamina is being recorded on. One particularly suitable arrangement for use with the present invention comprises at least one rotatable wheel mounted to the upper or lower gas cushion plate the wheel having a peripheral contact area for contacting a lamina, and at least one vacuum inlet on the periphery.

It should be noted that in the present specification the term vacuum is taken as being relative to the ambient pressure pertaining and is not necessarily a vacuum relative to atmospheric pressure.

Figure 2:
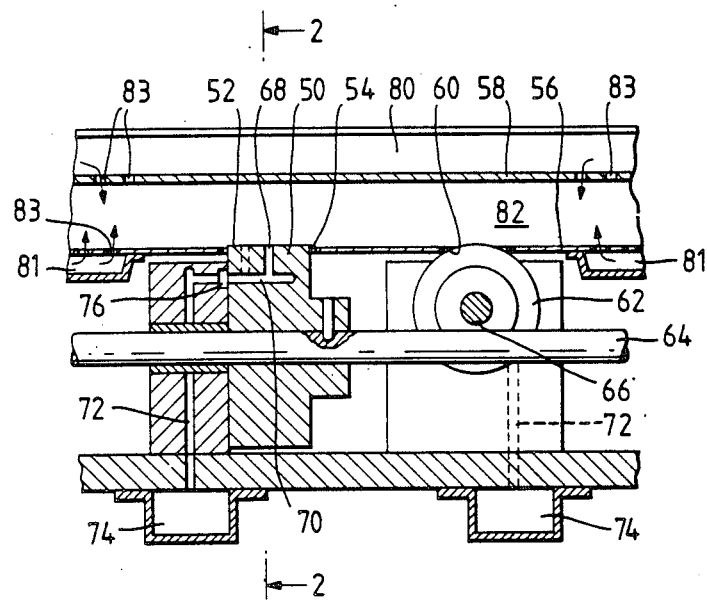
Figure 3:
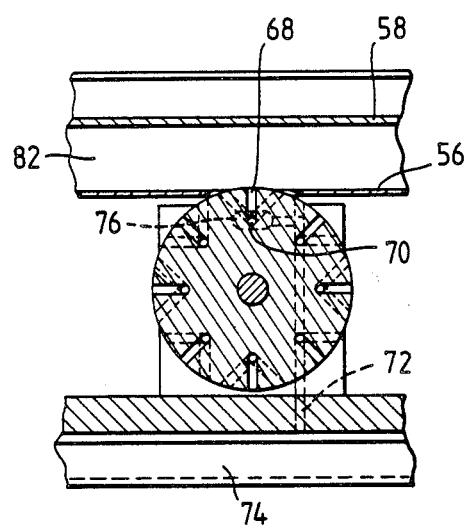
Figure 4:
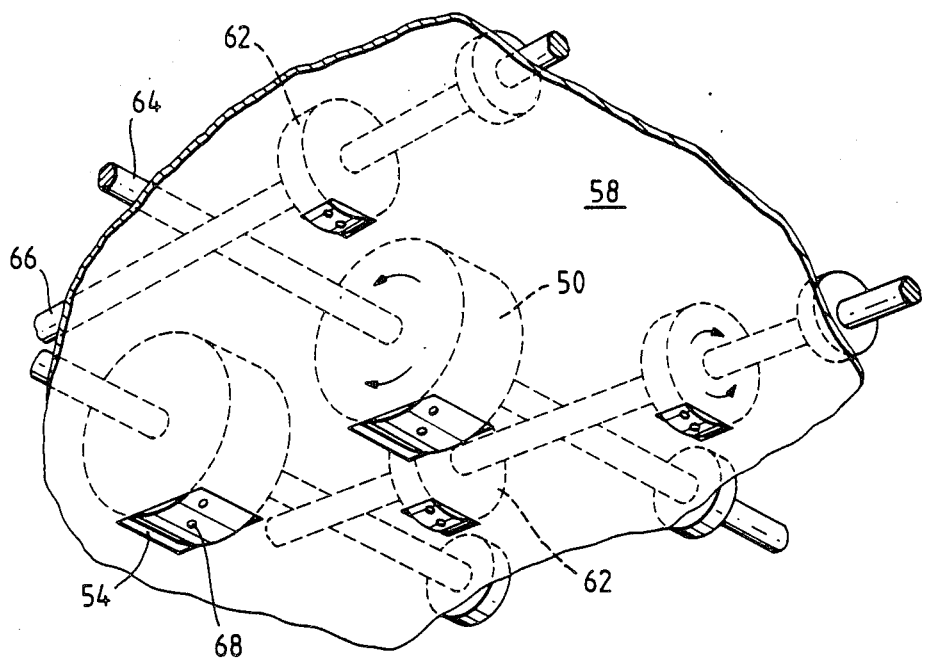

An embodiment of the invention will now be described by way of example with reference to the accompanying drawings in which:

FIG. 1 is a diagrammatic plan view of a storage and handling device according to the invention, FIG. 2 is an elevation of a vacuum wheel or roller arrangement for the device of FIG. 1, FIG. 3 is a section of the wheel of FIG. 2 taken at 2—2, and FIG. 4 is a perspective view of FIGS. 2 and 3.

Referring to FIG. 1 the lower plate 2 of the storage and handling device suitable for such laminae as microfiches is shown in a plan view. The transfer area lower plate 2 defines a transfer area and is provided with a plurality of holes locating stops (not shown) as shown in FIGS. 6, 7 and 8 of my U.S. Pat. No. 4,176,947 patented Dec. 4, 1979 the subject matter of which is incorporated by reference.

In the transfer area are treatment positions and 4 and 6 of which 4 may have the function of recording and toning as described in my U.S. Pat. No. 4,240,725 patented Dec. 23, 1980 the subject matter of which is incorporated by reference. Treatment position 6 may have the function of reading data recorded on a microfiche. The total area around each treatment position for controlled microfiche movement is indicated in broken lines at 8 and 10 respectively.

Around the periphery of the transfer are a number of lamina stores 20 for simple microfiche for holding frequently required data and at the end of the transfer area multiple fiche stores 22 are provided which may be of the kind described in my copending U.S. Pat. Application Ser. No. 823,765 filed 29th Jan. 1986.

Each single store 20 may be referred to as a "horse trap" and each multiple store 22 may be referred to as a "silo" for the sake of clarity.

Each horse trap has a "gate" formed by pins 24 whilst the "silos" have gates formed by pins 26 the operation of which is described in my copending U.S. Pat. Application Ser. No. 823,765 filed 29th Jan. 1986.

Each horse trap 20 has a control valve 24 and further control valves 26 are provided at the ends of the area 2.

To move a microfiche A out of its horse trap 20' gate pins 24' are lowered and a valve 27" (or 27') in the direction of required movement is opened, gas entering from above and below the horse trap flows towards the valve 24" and the microfiche A moves in the direction shown by arrow 30.

The arrangements for the gas to flow into the treatment area and horse traps is not shown but is the same as is shown in the aforesaid U.S. Pat. Nos. 4,176,947 and 4,240,725.

When microfiche lamina are required from the silos the silos are adjusted for height and are turned to bring the required microfiche into line with the silo outlet 32 or 33 as is described in the aforesaid copending U.S. Application Ser. No. 823,765. Inlet 34 or 35 is opened and an overpressure applied to eject the required fiche through the outlet into the treatment area. End valves 40-40" are opened as required causing a gas flow across the treatment area 2 to convey the microfiche towards a treatment position.

In order to assist directional movement bars 42 may be lowered or raised from the top or bottom plates.

Whilst the movement of laminae by gas flows is very advantageous for fast and coarse movement over some distances it is necessary for fine movement to move the microfiche laminae under positive control. One method of achieving this movement is shown in the aforesaid U.S. Pat. No. 4,176,947. A further method is shown in FIGS. 2 to 4.

FIG. 2 shows an 'X' axis wheel or roller 50 mounted with its peripheral cylindrical surface 52 protruding through aperture 54 in bottom plate 56 of the treatment area below top plate 58 between which the gas cushion is maintained. Protruding through aperture 60 is 'Y' axis wheel or roller 62.

Rollers 50 and 62 are rotated by shafts 64 and 66 respectively. Rollers 50 and 62 are provided with vacuum ports 68 which connect in groups of three to bores 70. The ports 68 are spaced apart both around the periphery and across the width of each roller in an axial direction. To provide a vacuum source to the rollers risers 72 from manifolds 74 connect with fixed ports 76 which adjoin bores 70.

The rollers may be in the top or bottom gas cushion plates 56, 58. In the perspective view of the roller arrangement of FIG. 4 the rollers are shown in top plate 58.

The arrangements or means for maintaining a cushion of gas between the plates 56 and 58 is essentially the same as described in my U.S. Pat. No. 4,176,947 but is indicated diagrammatically in FIG. 2 by upper and lower manifolds 80 and 81 with communication into the cushion chamber 82 via a multiplicity of jet holes 83 corresponding to holes 53 in U.S. Pat. No. 4,176,947. Solenoid operated stops 87 operating like probes 77 in U.S. Pat. No. 4,176,947 may be provided all over the transfer area 2.

It will be understood that variations and modifications can be effected within the spirit and scope of the invention as described herein above and as defined in the appended claims.

We claim:

1. In a film lamina storage and handling device having at least one treatment position where the film is treated, the device comprising upper and lower plates defining a transfer area therebetween at least partially enclosing the treatment position, means for maintaining a cushion of gas between the plates and within a periphery of the plates to support a lamina in a plurality of X and Y positions relative to the treatment position and means for moving the lamina relative to the treatment position the improvement wherein said lamina moving means comprises:

inlet means for supplying gas to said transfer area at a particular pressure and a plurality of controllable outlets selectively communicable with a pressure, outwardly of the periphery, lower than said particular pressure so as to move said lamina with said gas according to a pressure differential.

2. An improvment as claimed in claim 1 wherein the periphery of the plates is generally rectangular in shape and wherein a row of lamina stores is provided along two opposed sides of the periphery.

3. An improvement as in claim 1, said lamina moving means further comprising:
   at least one rotatable wheel having a lamina contacting surface on a periphery of said wheel and at least one vacuum duct communicating with said contacting surface, said contacting surface communicating with said transfer area so as to contact and move said lamina under a vacuum influence during rotation of said wheel.

4. In a film lamina storage and handling device having at least one treatment position where the film is treated, the device comprising upper and a lower plates defining a transfer area therebetween at least partially enclosing the treatment position, means for maintaining a cushion of gas between the plates and within a periphery of the plates to support a lamina in a plurality of X and Y positions relative to the treatment position, the improvement comprising:
   a plurality of lamina stores on the periphery of the transfer area, each store being substantially level with a medium level between the plates.

5. An improvement according to claim 4 wherein at least one lamina store is adapted to hold a single lamina and at least another lamina store is adapted to hold a plurality of laminae.

6. An improvement according to claim 5 wherein each single lamina store is provided with permanent walls and an openable gate formed by one or more stops.

7. An improvement according to claim 5 wherein each single lamina store has an openable gas valve at a side thereof remote from a center of the transfer area.

8. An improvement as claimed in claim 4 wherein the periphery of the plates is generally rectangular in shape and wherein a row of lamina stores is provided along two opposed sides of the periphery.

9. An improvement as in claim 4, further comprising:
   at least one rotatable wheel having a lamina contacting surface on a periphery of said wheel and at least one vacuum duct communicating with said contacting surface, said contacting surface communicating with said transfer area so as to contact and move said lamina under a vacuum influence during rotation of said wheel.

* * * * *